2,747,856
SUPPORT FOR BLOW TORCH
Howard A. Burdwood, South Portland, Maine Application August 29, 1951, Serial No. 244,192

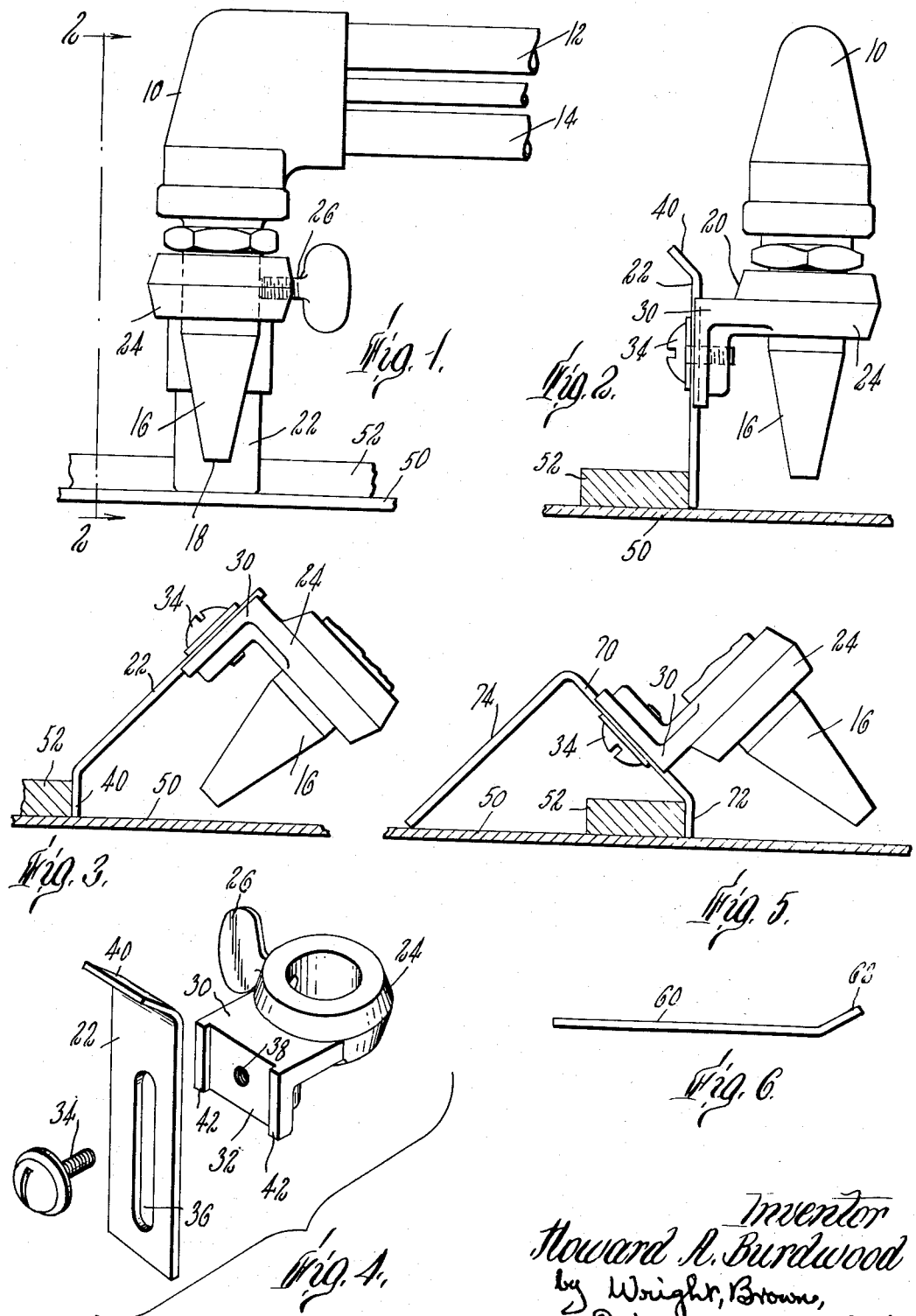

1 Claim. (Cl. 266—23)

This invention relates to a support for a blow torch by which the tip of the nozzle can readily be supported at the optimum distance from the surface of a sheet of steel or other object to be cut by the torch. It is frequently necessary to cut steel plate and the like along certain pattern lines. For some purposes the cutting is done at right angles to the face of the sheet, but when the cut edge is to be placed in abutting relationship with the cut edge of another piece so that the pieces can be welded together, it is customary to make a chamfer cut so that when such edges are abutted, they will form a V groove to receive welding metal. For this purpose the flame from the blow torch is directed against the face of the plate at a definite angle thereto such as 60° or 45°. A skilled operator can hold an unsupported torch in the cutting of the desired lines but even with skilled operators such cutting is liable to result in the spoiling of considerable stock. It is an object of the present invention to provide a support which will enable an operator of ordinary skill to cut effectively and accurately, the supporting structure being simple and easy to attach to and detach from an ordinary standard blow torch.

For a more complete understanding of the invention reference may be had to the following description thereof and to the drawing, of which—

Figure 1 is a fragmentary side elevation of a blow torch having an embodiment of the invention attached thereto;

Figure 2 is an end elevation of the same viewed as indicated by the line 2—2 of Figure 1;

Figure 3 is a view similar to Figure 2 but showing the support in a different position of adjustment for chamfer cutting;

Figure 4 is an exploded perspective view of the support itself, showing the several parts thereof;

Figure 5 is a fragmentary end view of a blow torch having attached thereto a support member of modified form; and Figure 6 is an edge view of a modified form of strip used in the support member.

In Figure 1 is shown the head 10 of a conventional blow torch, this head being mounted at the ends of tubes 12 and 14 by which the desired gases are conducted to the nozzle 16. The nozzle is detachably secured to the head 10, the visible portion thereof having a cylindrical upper part and a tapering lower part terminating in a tip 18 from which the flame projects. According to the invention a support structure is provided consisting of a bracket member 20 to which is detachably secured a rigid strip or blade 22. The bracket member 20 comprises a ring or collar 24 adapted to fit snugly on the cylindrical portion of the nozzle 16. A set screw 26 is threaded through the collar 24 and can be readily set up to clamp the collar tightly on the nozzle 16. The collar 24 is provided with a bracket element or extension 30 which has a plane face 32 parallel to the axis of the ring 14. The strip 22 is adapted to bear against the face 32 and to be clamped against the face by a set screw 34 which projects through a longitudinally extending slot 36 in the strip 22 and is screw threaded into the bracket element 30 as at 38. The strip 22 is elongated and has a relatively short end portion 40 which makes an oblique angle with the relatively long main portion of the strip. In order to maintain the strip in such position on the face 32 that its longitudinal dimension extends in a direction parallel to the axis of the nozzle 16, ribs 42 are formed at the side edges of the face 32, these ribs being spaced so that the strip 22 fits snugly between them when it is against the face 32. When the torch is to be used to cut a steel plate at right angles to the plane of the plate, the strip 22 is mounted on the bracket extension 30 in the manner indicated in Figure 2 with the end portion uppermost. If the lower portion of the strip which projects below the bracket element 30 is held perpendicular to the plane of the steel plate 50, then the nozzle 16 is also perpendicular to the plate. A heavy guide bar 52 may be employed to guide the strip 22 as the latter is moved along the edge of the bar. The bar 52 preferably has a rectangular cross section and may be either straight or may be shaped in accordance with the desired pattern to be cut by the torch. It is a relatively simple matter to draw the torch along while keeping the strip 22 perpendicular and in contact with an edge surface of the guide bar 52.

If a chamfer cut is desired for the purpose of preparing the cut edge to abut another edge so as to form a V groove to receive weld metal by which two pieces of plate can be united, the strip 22 is removed from the bracket 30 and is reversed, being secured to the bracket again with the end portion 40 lowermost. In the form of the strip 22 illustrated in Figures 2 and 3, the end portion 40 makes an angle of about 135° with the main portion of the strip. Hence when the end portion 40 is held against the guide bar 52 so that this end portion is perpendicular to the face of the steel plate 50 which is to be cut, the flame from the nozzle 16 is directed against the surface of the plate at an angle of about 45° thereto. Thus an edge with a 45° chamfer is readily cut as the torch is moved along the guide bar 52 with the end portion 40 of the strip 22 being maintained flatly against an edge face of the bar in the manner illustrated in Figure 3. If a 60° chamfer is desired, a blade 60 (Figure 6) may be provided which is similar to the blade 22 except that the end portion 62 which extends at an angle from the main portion of the strip 60 makes an angle of about 150° with the main portion. By attaching the strip 60 against the face 32 of the bracket member and holding the end portion 62 of the strip against an edge face of the guide bar 52, as indicated in Figures 2 or 3, the flame from the blow torch nozzle will cut the steel sheet in such a way as to chamfer the edge by an angle of 60°.

Figure 5 shows a modified form of strip in which the main portion 70 of the strip which is slotted to receive the screw 34 has a relatively short end portion 72 extending at an oblique angle such as 135° from the main portion. At the other end of the main portion, an extension 74 projects, this extension being of the right length to touch the surface of the plate 50 when the short end portion 72 is perpendicularly abutting the face of the plate. If the extension 74 is at right angles to the main portion 70 of the strip, the extension will be approximately equal in length to the combined lengths of the main portion 70 and its end portion 72 so that when both ends of the strip are in contact with the face of the plate 50 the torch nozzle 16 will be held in position to make a 45° cut.

I claim:

In combination with a bracket member adapted to be releasably secured to a blow torch nozzle, a rigid strip having a straight portion adapted to bear against said bracket member, a relatively short end portion at one end of said straight portion making therewith an angle of 135°, and an extension at the other end of said straight portion and of a length to touch a plane surface perpendicularly abutted by said short end portion, and means releasably and adjustably securing said strip to said bracket member.

References Cited in the file of this patent

UNITED STATES PATENTS

| Number | Name | Date |
|---|---|---|
| 730,779 | Lacy | June 9, 1903 |
| 1,139,048 | Messer | May 11, 1915 |
| 1,704,473 | Greene | Mar. 5, 1929 |
| 1,751,691 | Flath | Mar. 25, 1930 |
| 1,788,675 | Johnson | Jan. 13, 1931 |
| 2,103,485 | Meyer | Dec. 28, 1937 |
| 2,281,814 | Willoughby | May 5, 1942 |
| 2,358,772 | Brown et al. | Sept. 26, 1944 |
| 2,452,718 | Blythe | Nov. 2, 1948 |
| 2,596,133 | Donahue et al. | May 13, 1952 |

FOREIGN PATENTS

| Number | Country | Date |
|---|---|---|
| 249,518 | Germany | Mar. 5, 1911 |